(No Model.)
J. K. PRIEST.
POWER TRANSMITTER FOR CLIPPING MACHINES.
No. 524,213. Patented Aug. 7, 1894.
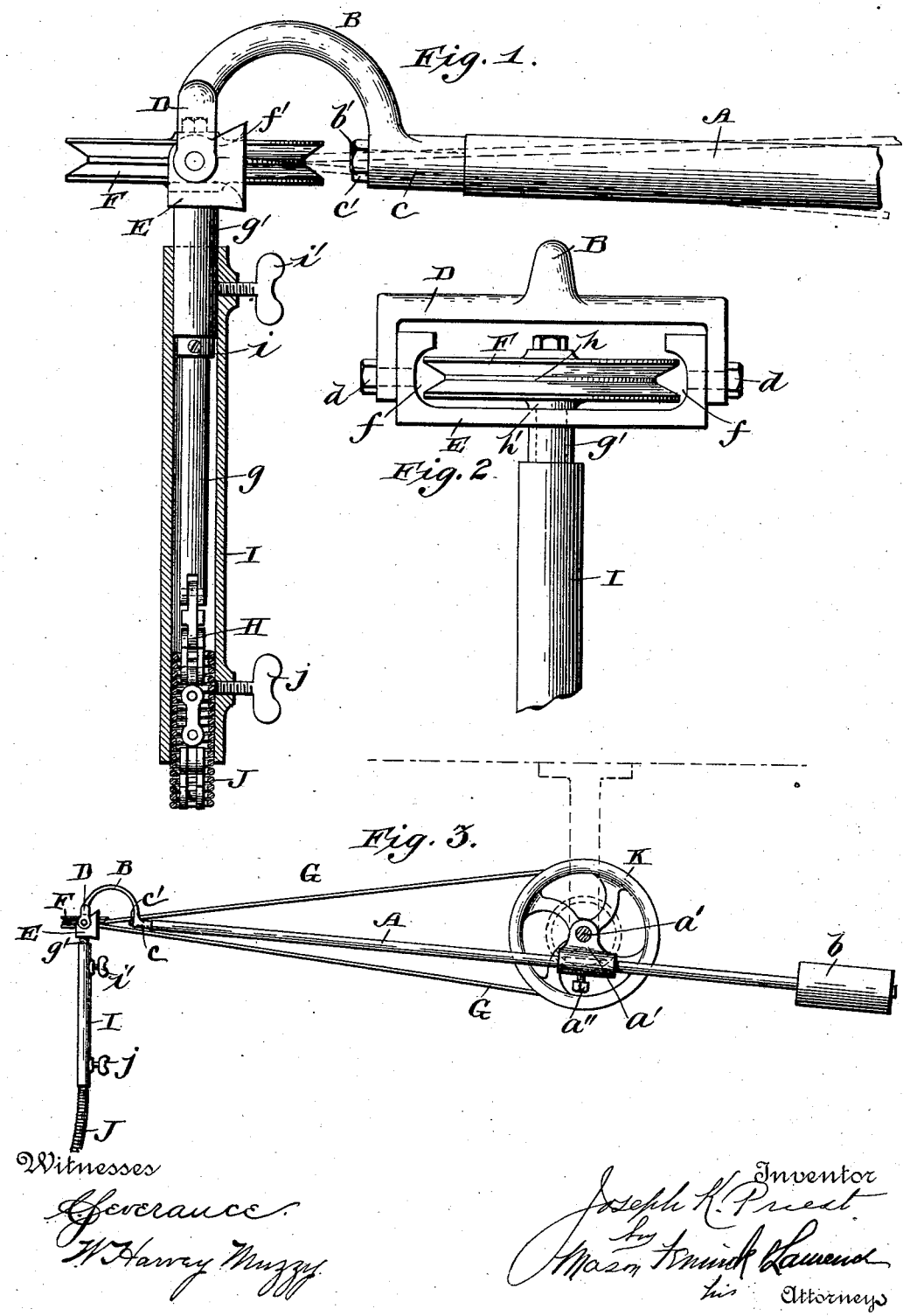

UNITED STATES PATENT OFFICE.

JOSEPH K. PRIEST, OF NASHUA, NEW HAMPSHIRE.

POWER-TRANSMITTER FOR CLIPPING-MACHINES.

SPECIFICATION forming part of Letters Patent No. 524,213, dated August 7, 1894.

Application filed February 14, 1894. Serial No. 500,148. (No model.)

*To all whom it may concern:*

Be it known that I, JOSEPH K. PRIEST, a citizen of the United States, residing at Nashua, in the county of Hillsborough and State of New Hampshire, have invented certain new and useful Improvements in Power-Transmitters for Clipping-Machines; and I do hereby declare the following to be a full, clear, and exact description of the invention, such as will enable others skilled in the art to which it appertains to make and use the same.

My invention relates to improvements in power transmitters for clipping machines and the objects of the invention are, first, to provide a connection between the power shaft and the flexible chain for operating the clipper whereby said chain as a whole can be raised or lowered, swung backward and forward and from side to side or in any intermediate direction at will, also to provide power transmitting means for making the said connection between the power shaft and the flexible chain which will allow the above mentioned movement of the chain without breaking or decreasing the transmission of power to said chain. I accomplish these objects by the devices described in the following specification and illustrated in the accompanying drawings, in which latter—

Figure 1. represents a side elevation, partly in section, of the devices embodying my invention. Fig. 2. represents a detail side elevation of the belt wheel carrying frame and its swivel support, and Fig. 3. represents a side elevation of my devices complete, showing the balance arm and its attachment to the power shaft.

A in the drawings, represents the balance arm which is suspended from the power shaft $a$ by the hanger $a'$ through which it passes and in which it is adjustably secured by the set screw $a''$, said hanger being loosely mounted on said shaft so that it may turn on the same and thus permit the balance arm to move up and down at will.

The balance arm is provided at its rear end with a counter balance weight $b$ and at its forward end with an arched supporting arm B provided with a sleeve $c$ which is loosely mounted on the end of said arm and secured in place by a nut $c'$. The outer end of this arched support is provided with a transverse pendent yoke D through the lower ends of which bolts $d$ are passed, the ends of said bolts projecting inward and form pivotal pins upon which are loosely mounted the ends of the respective arms of a belt wheel supporting yoke E so that the latter is free to oscillate thereon. Each arm on this yoke is provided at its inner side with a groove or channel $f$ which is flared at the end nearest the balance arm, as at $f'$, shown in dotted lines in Fig. 1.

The belt wheel F is mounted on a shaft $g$ which in turn is loosely mounted in a sleeve $g'$, which is integral with the yoke E. The said belt wheel is provided with a V-belt groove, and an angular shoulder $h'$ which bears upon the yoke E as the wheel revolves and thereby elevates said wheel into such a position that it will pass through the center of both of the grooves $f$, $f$, and the belt G passing about the said belt wheel is kept in said V-groove by means of the walls of the grooves $f$, $f$, which guide said belt into said groove no matter what the position of the wheel may be, the flaring mouths $f'$ serving to guide the belt into said grooves $f$ with a minimum of friction. The belt G passes about the belt wheel F which is supported by the yoke E and thence to and about a belt wheel $k$ mounted on the power shaft $a$ and thus the power is transmitted to the said wheel F.

The belt wheel is prevented from rising in its seat by means of a sleeve $i$ which is adjustably mounted on the shaft $g$ below the end of the sleeve $g'$ against which it bears, and is held in place by a screw as shown. The lower end of the shaft $g$ is bifurcated so as to receive and secure the end link of the flexible power transmitting chain H. A sleeve I is attached to the lower part of the sleeve $g'$ by a thumb screw $i'$. A coil spring J surrounds the power transmitting chain H and has its upper end attached within the lower end of the sleeve I by means of a thumb screw $j$.

It will be seen from the foregoing that the power transmitting chain as a whole can be moved up and down by means of the balance arm A and its pivoted hanger, and moved from side to side by reason of the construction of the swivel connection between the arm A and the arched arm B, and backward and forward by reason of the pivotal connection between the yokes D and E.

The counterbalance $b$ will keep the balance arm A normally in nearly a horizontal plane but will allow it to move up and down upon the slightest pressure being exerted.

What I claim as my invention is—

1. In a power transmitter, the combination of a swinging balance arm mounted on a power shaft and provided with a swivel belt wheel supporting end having a fixed pendent yoke, an oscillating yoke pivoted in said fixed yoke and provided with flaring mouth guiding grooves, a shaft passed through the oscillating yoke and carrying at its upper end a belt wheel, and an operating chain connected to the lower end of said shaft, whereby a driving belt from the power shaft will be guided and held in position on said belt wheel without regard to the position of the said wheel, substantially as described.

2. In a power transmitter, the combination of a swinging balance arm mounted on a power shaft and provided with a swivel belt wheel supporting end having a fixed pendent yoke an oscillating yoke pivoted in said fixed yoke and provided with flaring mouth grooves and a pendent sleeve, a shaft passed through said sleeve and carrying at its upper end a belt wheel, an operating chain connected to the lower end of said shaft, a coil spring surrounding said chain, a sleeve, and thumb screws for adjustably connecting said sleeve to the pendent sleeve and said spring, the construction and operation being such that the driving belt from the power shaft will be guided and held in position on said belt wheel without regard to the position of the belt wheel, substantially as described.

In testimony whereof I affix my signature in presence of two witnesses.

JOSEPH K. PRIEST.

Witnesses:
C. D. PARKER,
C. E. ARMSTRONG.